(12) United States Patent
Matan et al.

(10) Patent No.: US 11,077,001 B2
(45) Date of Patent: Aug. 3, 2021

(54) WHEEL APPARATUS FOR CLIMBING STAIRS

(71) Applicants: Daniel Matan, Bnei Brak (IL); Yavgeni Torgovizki, Holon (IL)

(72) Inventors: Daniel Matan, Bnei Brak (IL); Yavgeni Torgovizki, Holon (IL)

(*) Notice: Subject to any disclaimer, the term of this patent is extended or adjusted under 35 U.S.C. 154(b) by 294 days.

(21) Appl. No.: 16/231,604

(22) Filed: Dec. 24, 2018

(65) Prior Publication Data

US 2020/0197245 A1    Jun. 25, 2020

(51) Int. Cl.
| | |
|---|---|
| *A61G 5/06* | (2006.01) |
| *A61G 5/10* | (2006.01) |
| *B60B 15/02* | (2006.01) |
| *B60C 7/14* | (2006.01) |
| *B60C 7/16* | (2006.01) |

(52) U.S. Cl.
CPC ............... *A61G 5/061* (2013.01); *B60C 7/14* (2013.01); *B60C 7/16* (2013.01); *A61G 5/10* (2013.01); *B60B 15/02* (2013.01)

(58) Field of Classification Search
CPC .... A61G 5/061; A61G 5/065; A61G 2203/70; A61G 5/10; B62B 5/02; B62B 5/028; B62B 9/02; B60B 21/062; B60B 21/104; B60B 15/02; B60B 15/028; B60B 9/02; B60B 25/20; B60C 7/16; B60C 7/18; B60C 7/10; B60C 7/14

See application file for complete search history.

(56) References Cited

U.S. PATENT DOCUMENTS

| | | | | |
|---|---|---|---|---|
| 459,015 | A * | 9/1891 | Myers | B60C 7/14 152/272 |
| 504,413 | A * | 9/1893 | Brown | B60C 7/14 152/256 |
| 621,504 | A * | 3/1899 | Ramsey | B60C 7/14 152/271 |
| 640,863 | A * | 1/1900 | Birdsall | B60C 7/102 152/304 |

(Continued)

OTHER PUBLICATIONS

Wheelchair Tyre Types, downloaded from website on Dec. 16, 2018: http://www.draftwheelchairs.com/855/wheelchair-tyres/.

(Continued)

*Primary Examiner* — Minnah L Seoh
*Assistant Examiner* — Harold Eric Pahlck, III
(74) *Attorney, Agent, or Firm* — Carrie Stroup

(57) ABSTRACT

A puncture resistant wheel apparatus, and method of use, for safely climbing obstacles are disclosed herein. A plurality of wheel apparatuses is mounted on a vehicle (e.g. a wheelchair, cart, mountain bicycle, etc.) to enable it to safely traverse obstacles, such as a flight of stairs, road curbs, etc. without slipping, and while creating a smoother ride. Each wheel apparatus comprises: a tire comprising a plurality of teeth sections separated via a thin space to grip an obstacle edge between the teeth; a circular rim attachable to the tire inner surface via T-joints, and a plurality of evenly spaced spokes extending to a central hub; and two hoop rings, mounted on opposing tire sidewalls. The center of each tire tooth section further comprises an elastic unit, comprising a vertical spring and two horizontal springs that further act to dampen the vibrational and jarring forces exerted on the wheel apparatus.

15 Claims, 8 Drawing Sheets

(56) References Cited

U.S. PATENT DOCUMENTS

| | | | | |
|---|---|---|---|---|
| 895,452 A * | 8/1908 | Greenfield | ............... | B60C 7/14 |
| | | | | 152/252 |
| 919,826 A * | 4/1909 | Clausen | ............... | B60C 7/16 |
| | | | | 152/284 |
| 950,127 A * | 2/1910 | Broome | ............... | B60C 7/14 |
| | | | | 152/303 |
| 962,975 A * | 6/1910 | Peloubet | ............... | B60C 7/14 |
| | | | | 152/272 |
| 972,606 A * | 10/1910 | Ellis | ............... | B60C 7/14 |
| | | | | 152/247 |
| 1,027,983 A * | 5/1912 | Bropson | ............... | B60C 7/14 |
| | | | | 152/271 |
| 1,041,829 A * | 10/1912 | Mallory | ............... | B60C 7/14 |
| | | | | 152/256 |
| 1,315,343 A * | 9/1919 | Shipley | ............... | B60C 7/16 |
| | | | | 152/249 |
| 2,286,507 A * | 6/1942 | Quinn | ............... | B60C 17/04 |
| | | | | 152/520 |
| 2,807,304 A * | 9/1957 | Pellegrino | ............... | B60C 7/00 |
| | | | | 152/208 |
| 2,941,565 A * | 6/1960 | Rusch | ............... | B60C 17/06 |
| | | | | 152/158 |
| 4,556,229 A | 12/1985 | Bihler et al. | | |
| 5,094,310 A * | 3/1992 | Richey | ............... | B60K 1/02 |
| | | | | 180/65.6 |
| 5,242,180 A * | 9/1993 | Bergeron | ............... | A61G 5/00 |
| | | | | 280/250.1 |
| 7,850,189 B2 | 12/2010 | Barber et al. | | |
| 2006/0076822 A1 * | 4/2006 | Lamprich | ............... | A61G 5/10 |
| | | | | 301/5.23 |
| 2018/0021193 A1 | 1/2018 | Matan et al. | | |

OTHER PUBLICATIONS

Automobile tire tread patterns, downloaded from website on Dec. 16, 2018: http://www.tireprofiles.com/tread-pattern-anatomy/.

Wheelchair tire guide, downloaded from website on Dec. 16, 2018: http://wheelinmobility.com/wheelchair-tires-simplified-2/.

* cited by examiner

WHEEL APPARATUS FOR CLIMBING STAIRS

TECHNICAL FIELD

The present disclosure generally relates to wheels. More particularly, the present disclosure relates to a wheel that is able to easily overcome obstacles without slipping, such as on stairs, and with reduced vibrations, for use in wheelchairs, mountain bikes, carts, light SUVs, etc.

BACKGROUND

Tires in the prior art generally comprise an inflated tire tube within a rubber tread, covering the outer surface of a metal tire rim comprising spokes connected to a central hub. Tires on vehicles, such as automobiles, wheelchairs, and bicycles, must further be pumped with compressed air to manufacturer specified ranges of pounds per square inch (psi) to avoid damage to the shape of the tire tread. When punctured, the tires easily deflate and require immediate repair.

In lieu of pneumatic wheelchair tires comprising compressed air in a tire tube, wheelchair tires may be filled with rubber, plastic or foam. Semi-pneumatic wheelchair tires are made of solid rubber or plastic with a ring of air in the center. Foam wheelchair tires are constructed from pneumatic tire inserts filled with polyurethane foam instead of air. And solid wheelchair tires comprise molded rubber or plastic throughout the tire thickness.

In addition to tire inflation methods, the smoothness and ability of the tires not to slip on surfaces (e.g. wet) or while traversing obstacles, depends on the tire tread. Tread pattern types are numerous and often a trademark of a specific manufacturer. Wheelchair tire tread often comprises a pattern of small knobs, while automobile and bicycle tire treads may comprise elaborate patterns of circumferential grooves encircling the entire tire tread, and breaking the tread into lanes, wherein the lanes may further comprise unique cut-outs and lateral grooves.

Despite various tire tread types and inflation methods, tires often slip and hydroplane on surfaces and/or while traversing obstacles (e.g. stairs, road edges, sidewalk curbs, etc.).

The prior art discloses wheelchair systems that can climb stairs and curbs, although not with ease or necessarily in a safe manner that protects against the wheelchair slipping out of control down the stairs.

For example, U.S. Pat. No. 7,850,189 that issued Dec. 14, 2010 to Barber et al. discloses a curb climbing wheelchair system having left and right-side attachments that are designed to be attached to the left and right-side portions, respectively, of a standard wheelchair to enable a wheelchair occupant to climb a curb, bump or other obstruction without the aid of another individual. Each attachment includes a ramp extending from a telescoping arm that is designed to be attached, via a clamping system, to one side of the wheelchair. When not in use, the ramps are folded and stowed away on the sides of the wheelchair. During use, the ends of the ramps are placed on the curb to allow the wheelchair occupant to climb the curb. To retrieve the ramps, the wheelchair occupant moves the telescoping arms, if necessary with the aid of an attached circular handle, to lift the ramps thus allowing the wheelchair occupant to grab the ramps. The retrieved ramps then are stowed away until needed. Unfortunately, with this wheelchair design it is physically demanding and time consuming for the wheelchair occupant to setup and store the ramps whenever they run into an obstacle. It also appears that the wheelchair ramps cannot be used with a flight of stairs, and it limited to overcoming curbs and other small obstacles.

Additionally, U.S. Pat. No. 4,556,229 that issued Dec. 3, 1985 to Bihler discloses an apparatus comprising rotating flat tracks that is attached to the bottom of a wheelchair for moving the wheelchair on a flight of steps like a conveyor belt. The apparatus has a support adapted to engage underneath the wheelchair when it is in upright condition. Two or more tracks allow the wheelchair to move over uneven terrain and up and down stairs. A safety device is connected to a latch for blocking the latch from moving into the freeing position when the tracks are inclined at more than a predetermined angle to the horizontal. Thus, the wheelchair cannot be released from the support-tracks when it is moving on an incline. Never-the-less, the apparatus must be deployed every time the wheelchair faces an obstacle, but the apparatus is not easily stored or deployed from the wheelchair.

In the light of the aforementioned discussion, there exists a need for novel wheel apparatuses that are mounted on a vehicle (e.g. a vehicle comprising a wheelchair, cart, mountain bicycle, light SUV, etc.) to enable the vehicle to safely traverse obstacles, such as a flight of stairs, road curbs, etc. without slipping off the obstacle. It is also especially beneficial if the tire is not easily punctured and deflated.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Tire with Teeth Tread Sections

The present invention comprises a climbing wheel apparatus for use on a vehicle that safely traverses obstacles while providing a smoother ride, the wheel apparatus comprising the following components: a tire comprising a plurality of individual teeth sections each with a tire inner surface, two opposing sidewalls, an outer tire tread surface, and wherein each tooth section is substantially rectangular-shaped or square-shaped with a center elastic unit, and adjoining teeth sections are separated via a thin space; a circular rim with a rim inner surface, and rim outer surface attachable to the plurality of teeth sections, and a plurality of evenly spaced wheel spokes extending from the rim inner surface to a central hub; two hoop rings mounted on both opposing tire sidewalls covering the rim while exposing the tire teeth section's outer tread surface and the elastic unit; and wherein the wheel apparatus is able to traverse obstacles safely, without slipping, by the adjoining tire teeth sections gripping an obstacle edge and/or a floor surface.

Tire Tread Notches and Elastic Middle

Each tire section further comprises a rubber material outer surface encasing a middle elastic section. The middle elastic section, in an embodiment, extends outward from the tire (e.g. protruding oval or rectangular shaped sections), and houses elastic material, such as at least one spring, vertically oriented; and two horizontal springs. The elastic section, and the tire tread notches, further dampen/reduce the vibrations of the wheel's mechanical structure for a smoother ride, and to reduce jarring of components within the wheel(s) and the vehicle structure it supports.

The wheel apparatus circular rim outer surface further comprises a plurality of evenly spaced, substantially T-shaped projections encircling the rim, spaced to fit adjoining teeth sections inner surface.

The wheel apparatus tire teeth section inner surface further comprises two substantially L-shaped units, and a retaining pin, able to securely fit the tire teeth section to the rim outer surface.

The wheel apparatus tire outer tread further comprises a plurality of evenly spaced lateral grooves with protrusions extending between the tire opposing sidewalls that are able to grip or adhere to an obstacle surface to prevent the wheel apparatus from slipping.

In an embodiment, the wheel apparatus comprises one hoop is permanently affixed to the circular rim.

Each tire tooth section further comprises a rubber material outer surface comprising depressions encasing the center elastic section. Each elastic section comprises at least one spring extending vertically, and encased by the elastic material, enabling the tire to provide a dampening of a vibration and of a jarring-forces on the wheel apparatus and on the vehicle. And the elastic section within each tooth section further comprises at least two horizontal springs.

The wheel apparatus is mounted on a vehicle that is powered or manually propelled, and at least one-wheel apparatus is mounted on one or more of: a wheelchair, a push-cart, a mountain bicycle, a road bicycle, a light sport utility vehicle, a jeep, and a go-cart. In an embodiment, the vehicle is a wheelchair comprising a wheeled apparatus on opposing wheelchair sides. And the wheelchair may further comprise a push rim attached to the exterior rim side of each wheel apparatus that the user is able to rotate forward and backward to control movement of the wheelchair.

Method of Use

The present invention further comprises: a method of safely climbing a flight of stairs or over obstacles, with a vehicle comprising wheel apparatuses of the present invention, such as a wheelchair with two of the wheel apparatuses.

The method first comprises the step of affixing a wheel apparatus of the present invention to a vehicle, such as on opposing sides of a wheelchair. The method further comprises the steps of: rolling the vehicle (e.g. wheelchair) onto an obstacle until at least two adjoining tire teeth section are situated around an edge of the obstacle; pivoting the vehicle over the obstacle while the tire teeth section grip the obstacle edge; and wherein the wheel is able to traverse obstacles safely (e.g. stairs, curbs, etc.), without slipping, by the adjoining tire sections (teeth) gripping an obstacle's edges in front and back as it pivots the vehicle over the obstacle (e.g. the curb edge). In an additional embodiment, the wheelchair does not require the assistance of a caregiver pushing or pulling the wheelchair.

The features and advantage of the present invention will become readily apparent to those skilled in the art upon a reading of the following description of preferred embodiments taken in conjunction with the accompanying drawings.

BRIEF DESCRIPTION OF THE DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAIL DESCRIPTION OF EXEMPLARY EMBODIMENTS

Figure 1:
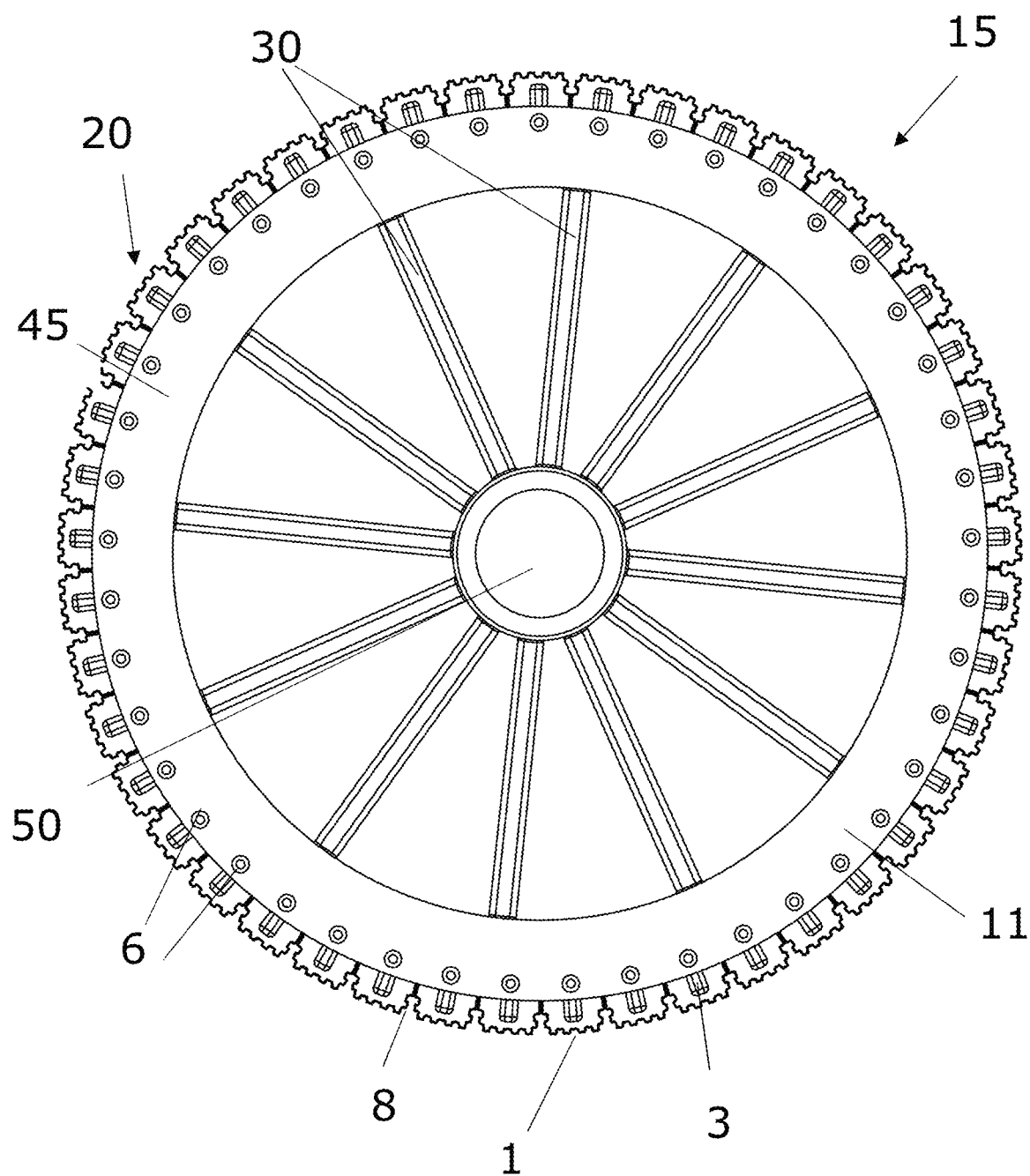
FIG. 1 is a diagram illustrating a side view of one exemplary embodiment of the wheel, the opposing side being a mirror image thereof.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof, as well as additional items.

The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element from another.

As used herein, the term "about" refers to plus or minus the stated amount.

As used herein, the term "substantially" refers to what is specified as understood by one of ordinary skill in the art to be of a shape easily recognized as similar to the stated shape.

FIGS. 1-8 illustrate the wheel apparatus of the present invention with the following components, as numbered below. The same elements are given the same reference numerals in the drawings and description thereof will not be repeated for each of the drawings.

TABLE 1

Wheel Apparatus (15) Part Numbers

| | |
|---|---|
| Wheel Hoop (2 total) | 45 |
| Hoop screw holes (6 total) | 11 |
| Hoop screws holes | 9 |
| Wheel Rim | 25 |
| Wheel spokes | 30 |
| Wheel Hub | 50 |
| Rim inner surface | 27 |
| Rim outer surface | 33 |
| Rim T-shaped protrusions | 14 |
| Space between T protrusions | 57 |
| Tire | 20 |
| Tire teeth sections | 1 |
| Outer space between teeth sections | 8 |
| Tire tread rectangular lateral protrusions | 7 |
| Tire lateral grooves | 19 |
| Tire outer surface | 39 |
| Tire inner surface | 17 |
| Inner tire surface "L-shaped units" | 12 |
| Tire inner space L units fit w/in | 38 |
| Inner line space between L-shaped units | 18 |
| Tire retaining pins (total 40+) | 6 |
| Retaining pin holes | 36 |
| Tire/teeth section sidewalls | 35, 37 |
| Tire middle elastic unit | 3 |
| Vertical spring w/in elastic unit | 23 |
| Horizontal springs (2 total) w/in elastic unit | 26 |
| Oval or ½ oval depressions | 5 |
| Depression inner wall | 13 |
| Push Rim (optional) | 55 |

Referring to FIGS. 1-8, the present invention comprises a wheel 15 that comprises the components of: a rubber tire 20 covering the outer surface of wheel rim 25; and the rim further comprising a plurality of wheel spokes 30 extending from the rim inner surface 27 of wheel rim 25 to a central wheel hub 50.

Figure 5:
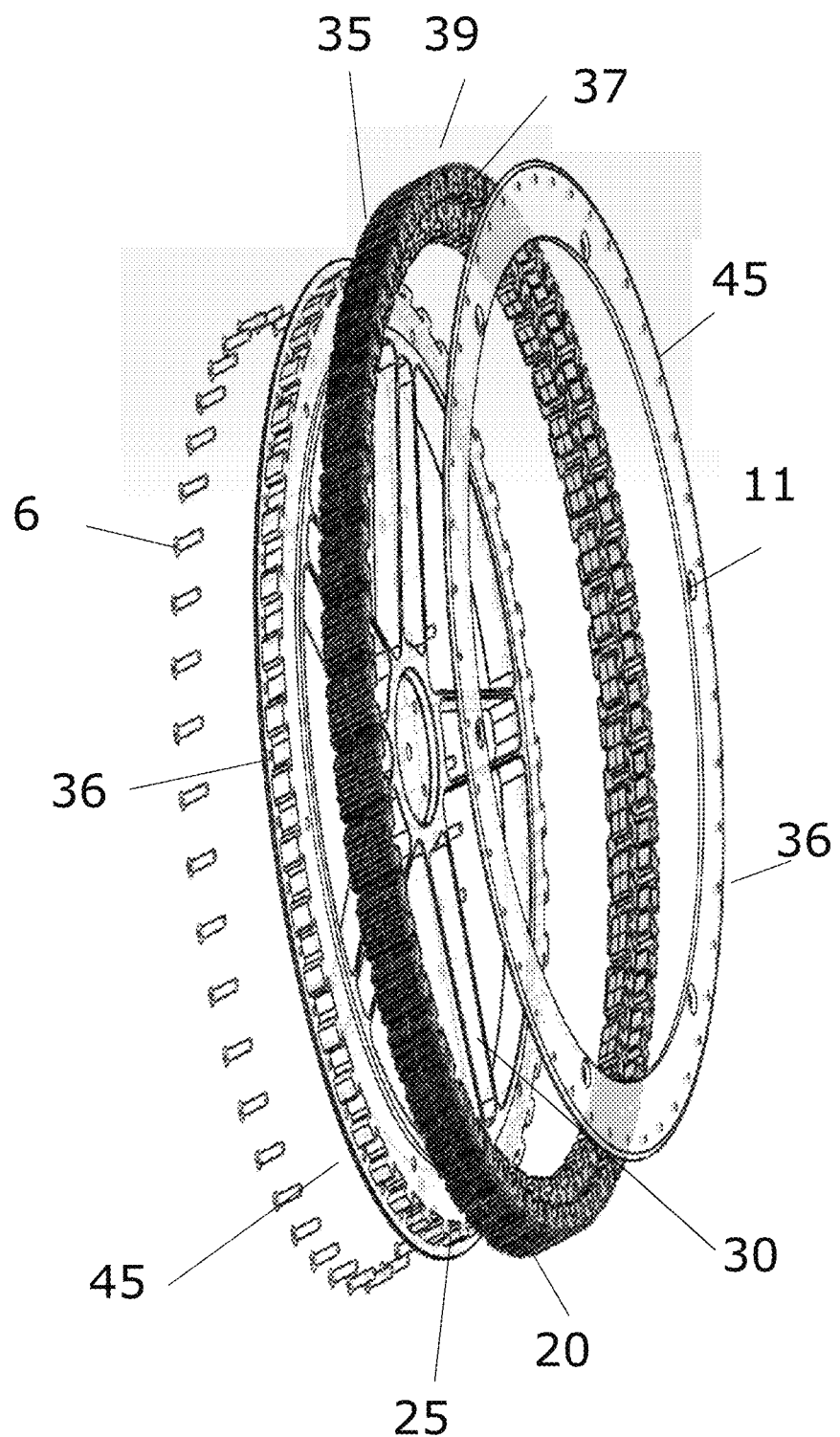
FIG. 5 is a perspective, exploded view of the wheel of FIG. 1, illustrating the wheel components comprising from right to left: a hoop; a tire with tread comprising a plurality of teeth sections; a rim with spokes and hub, and a hoop connected to the rim; and a plurality of retaining pins.

As illustrated in the exploded view of FIG. 5, wheel apparatus 15 components further comprise: two hoop's 45 that affix to opposing sides of the outer surface of the tire 20 (e.g. tire sidewalls, FIG. 5; 35, 37) via a plurality of screws 9 (e.g. 6 total screws shown, although other number of screws or pins or the like fixation devices are envisioned within the scope of this invention). The hoops 45 and their screws or pins 9 function to facilitate securing two hoops 45 to the wheel 15, while keeping the tire 20 and rim 25 in place.

Figure 7:
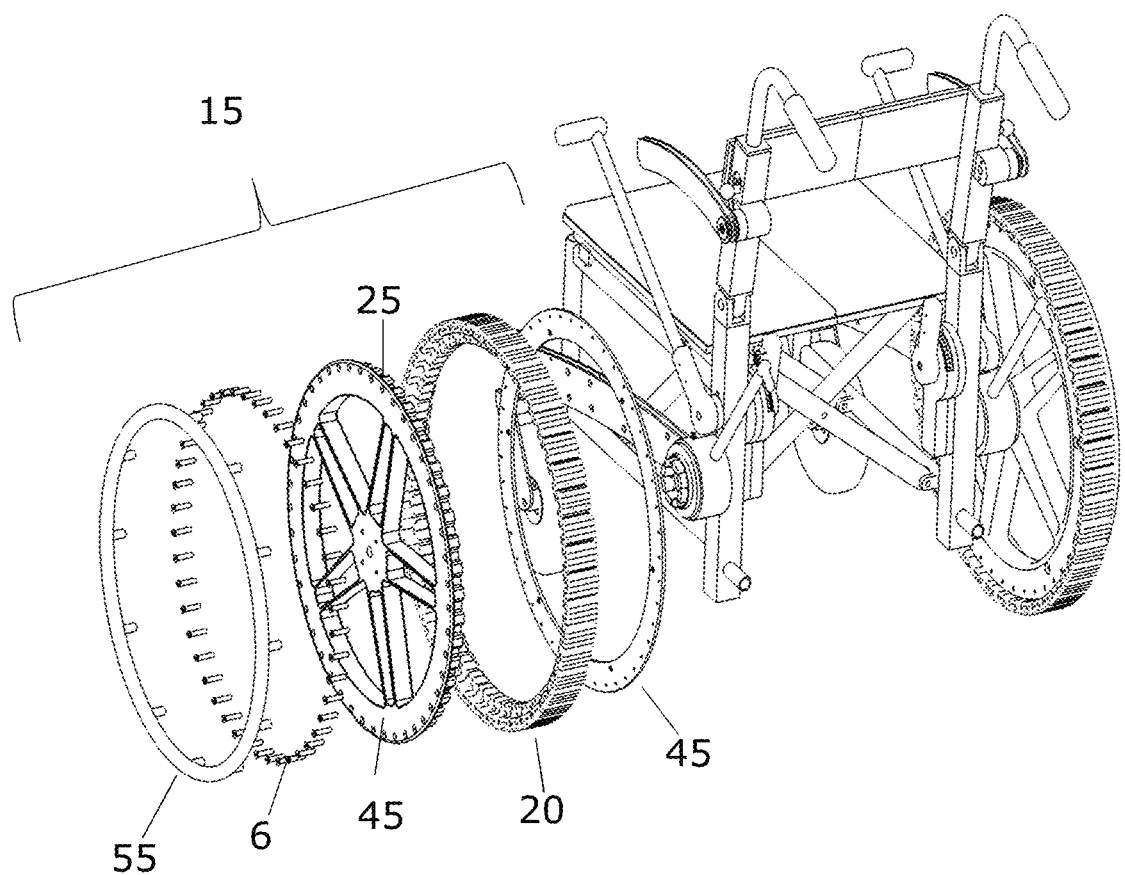
FIG. 7 is a rear exploded view of the exemplary wheelchair of FIG. 6, comprising two opposing wheels of the present invention mounted thereon, and a push rim mounted on each wheel's exterior surface or side.

In an embodiment of the wheel apparatus 15, one hoop 45 is permanently affixed to the circular rim 25, as illustrated in FIGS. 5 and 7.

It is noted that other exemplary embodiments of wheel spokes 30 (e.g. number, shape, etc.) and hubs 50 are envisioned within the scope of this invention, while affixed to the novel rim 25 comprising the novel outer surface 33 that interconnects with the novel tire 20 and novel hoops 45 as disclosed herein.

Tire

Tires of the present invention do not comprise compressed air requiring the tire to be inflated to a prescribed range of pounds per square inch (PSI). Instead, tire 20 comprises an elastic unit 3 within each tire tooth section 1, as discussed infra.

Tire 20 further comprises a plurality of individual teeth sections 1. Each tooth section 1, or the whole tire, further comprises: a tire inner surface 17 that connects to the rim 25 using a female (two part 12's) and a male fixation (14) connection (e.g. see FIGS. 3 and 4); two opposing tire sidewalls (FIG. 5, parts 35, 37); and an outer tread surface 39 comprising a pattern of lateral protrusions 7 with lateral grooves 19 that extend the width of the tire (e.g. FIG. 8). The tire and wheel apparatus size are based on the vehicle it is attached to, and/or the amount of load it must support. In one exemplary embodiment of a wheel apparatus, the tire thickness is about 30 to 300 millimeters, and the diameter is about 150 to 650 millimeters.

Figure 2:
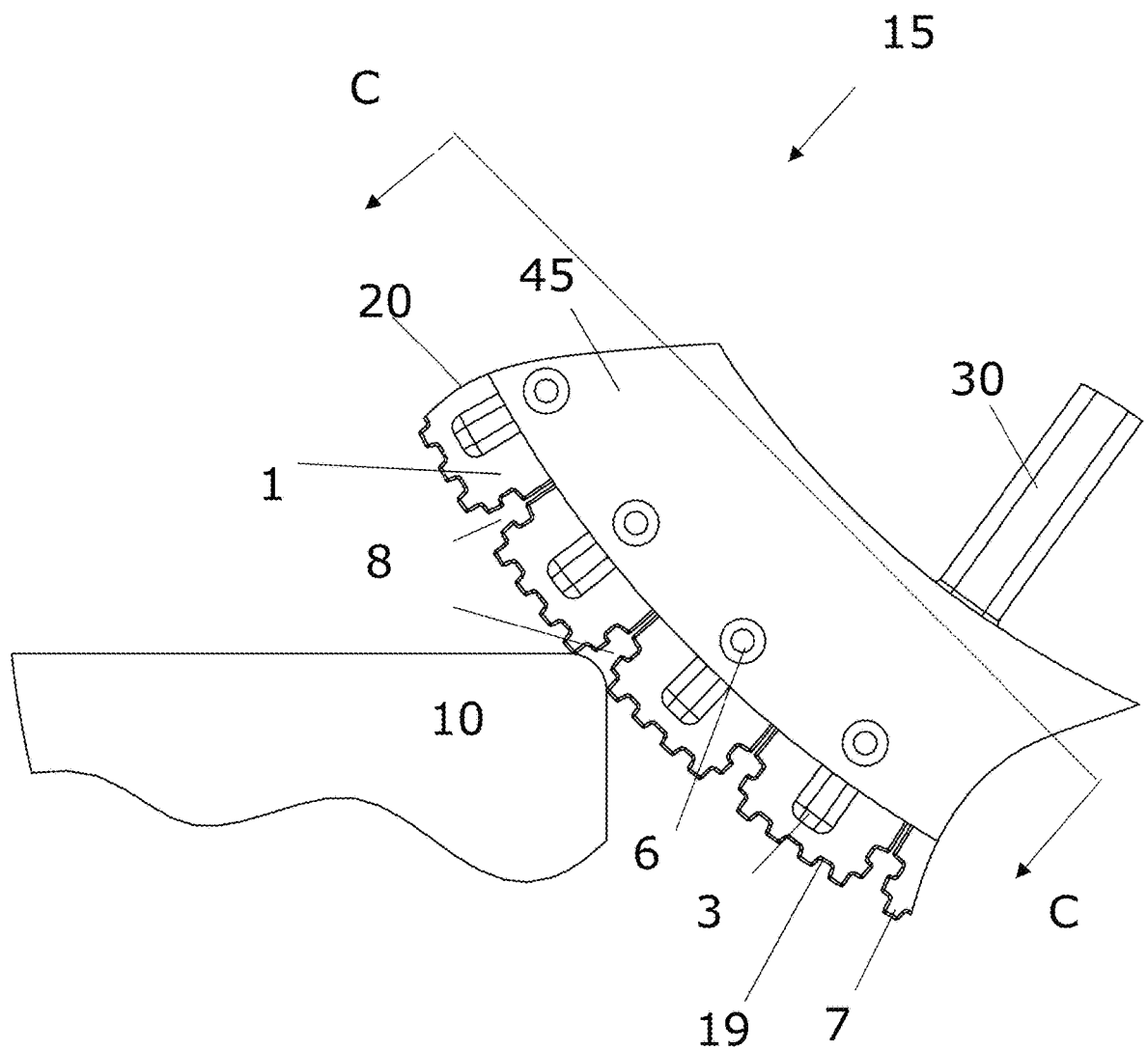
FIG. 2 is an enlarged side view of one hoop covering a wheel's tire tread, the hoop held by the retaining pins, and part of a wheel spoke that is connected to rim (not shown), and with the tire tread making contact with a curb, wherein the curb edge connects with the space between two adjoining tire tread teeth that's prevents the tire from slipping off the curb while also providing traction to climb atop of it.
Figure 3:
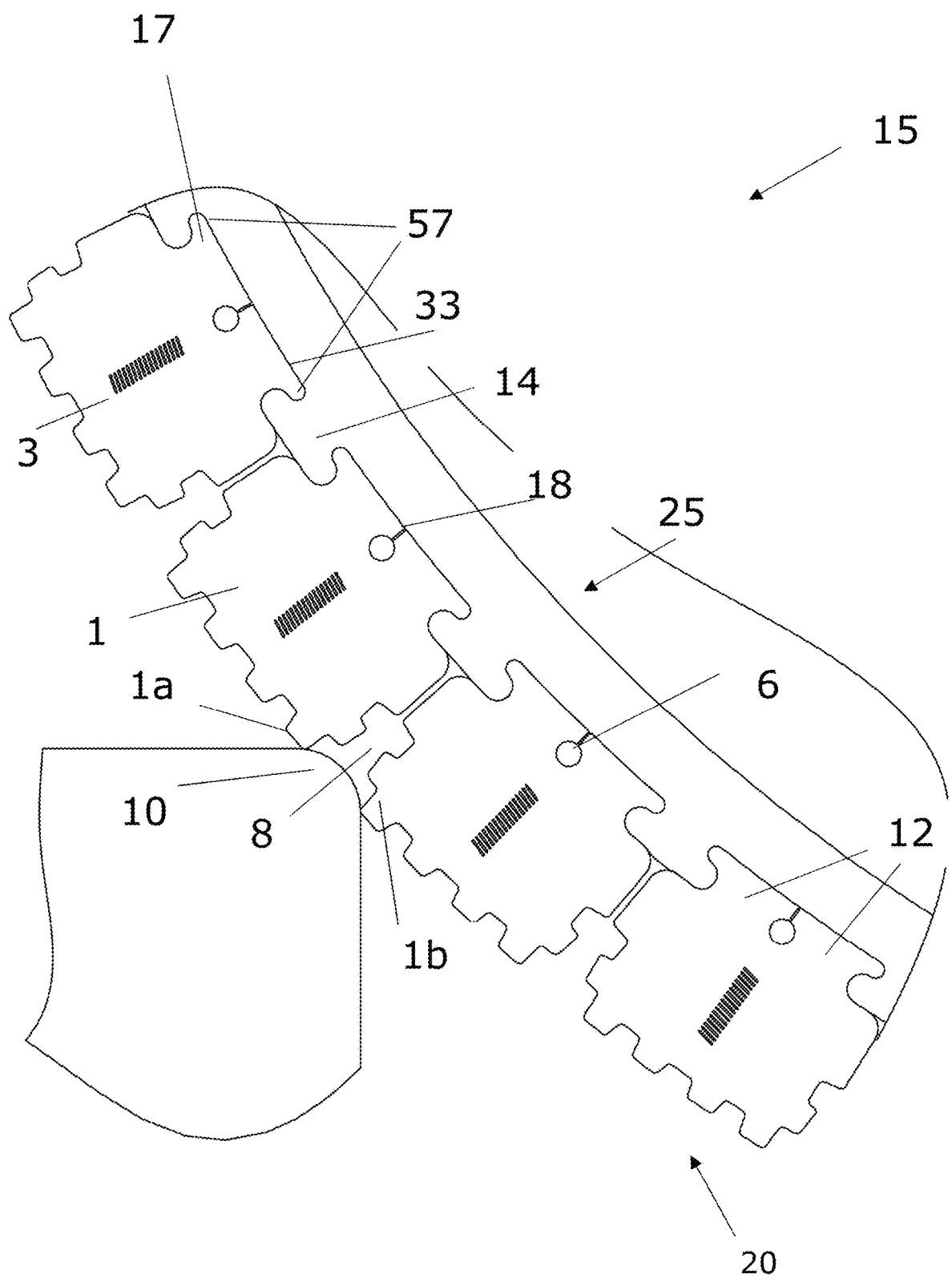
FIG. 3 is a longitudinal cross-sectional view along the line C-C of FIG. 2, illustrating the wheel's rim frame connected to the tire (but excluding the hoop), and showing the internal components within each tire section that comprises at least one spring oriented vertically.
Figure 6:
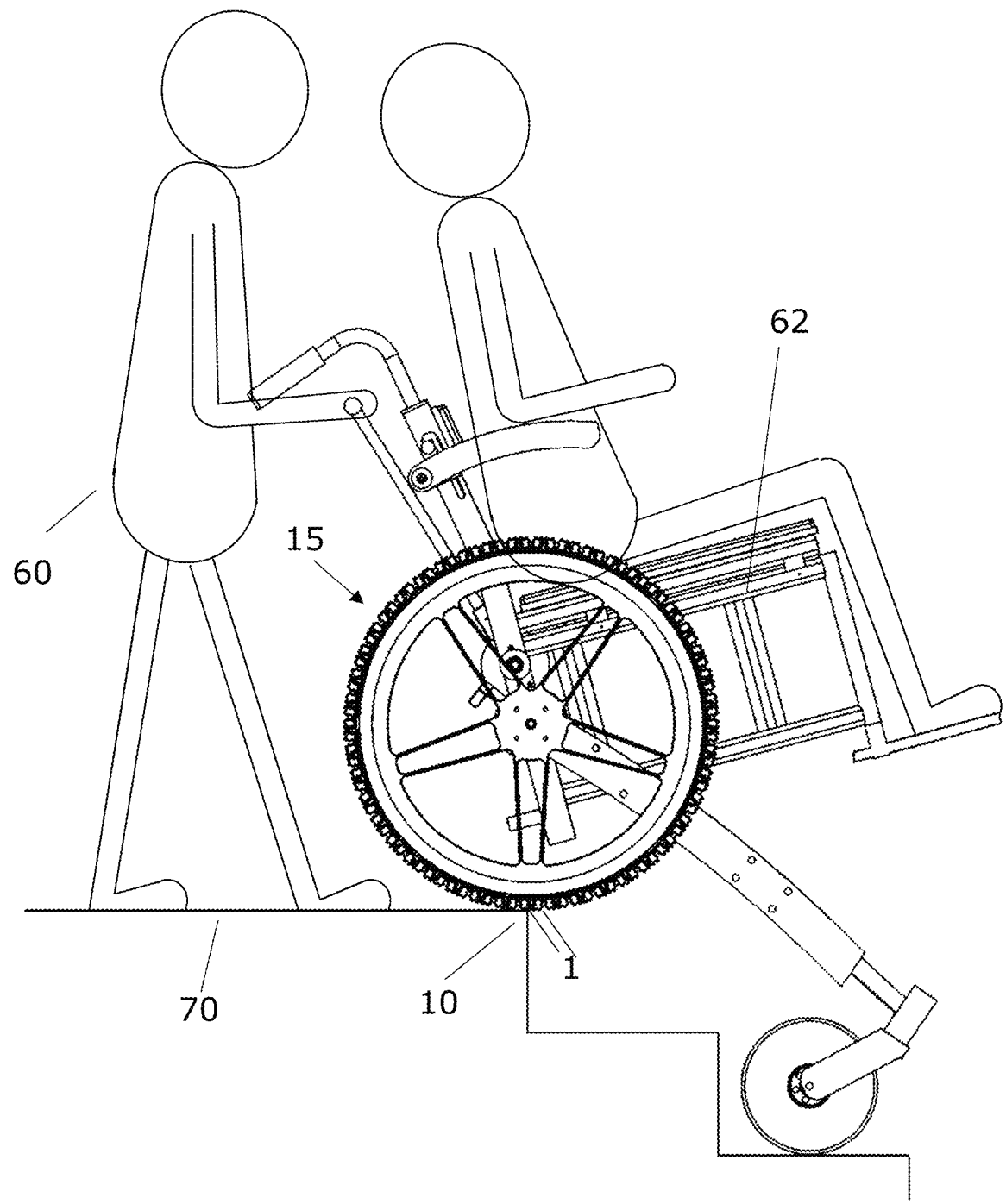
FIG. 6 is a side view of an exemplary wheelchair having mounted thereon two opposing wheels of the present invention with an outer push rim, and a caregiver pulling the wheelchair up a flight of stairs while the wheels' teeth sections grip the floor and the curb edge, and assist in preventing the wheelchair from slipping back down the flight of stairs.

Teeth sections 1 are substantially rectangular-shaped or square-shaped sections 1 (see FIGS. 2-4); and adjoining sections 1 are separated by a small substantially hourglass-shaped space 8 (e.g. about 3-10 millimeters wide depending on the tire size) that widens on impact to allow surrounding teeth sections 1 to cover the front and back of an obstacle edge (e.g. see FIGS. 3 and 6; edge 10). As illustrated in FIG. 3, when wheel 15 strikes an obstacle's edge 10 at a point of contact of a space 8 between any two teeth sections 1, then the tire is able to grip the obstacle edge 10 using the front section 1a and back section 1b of two adjoining teeth sections 1 to stabilize the wheel 15. The wheel and thus the vehicle it is mounted on, pivot over the obstacle edge while not slipping off of it due to the teeth sections' grip.

Figure 4:
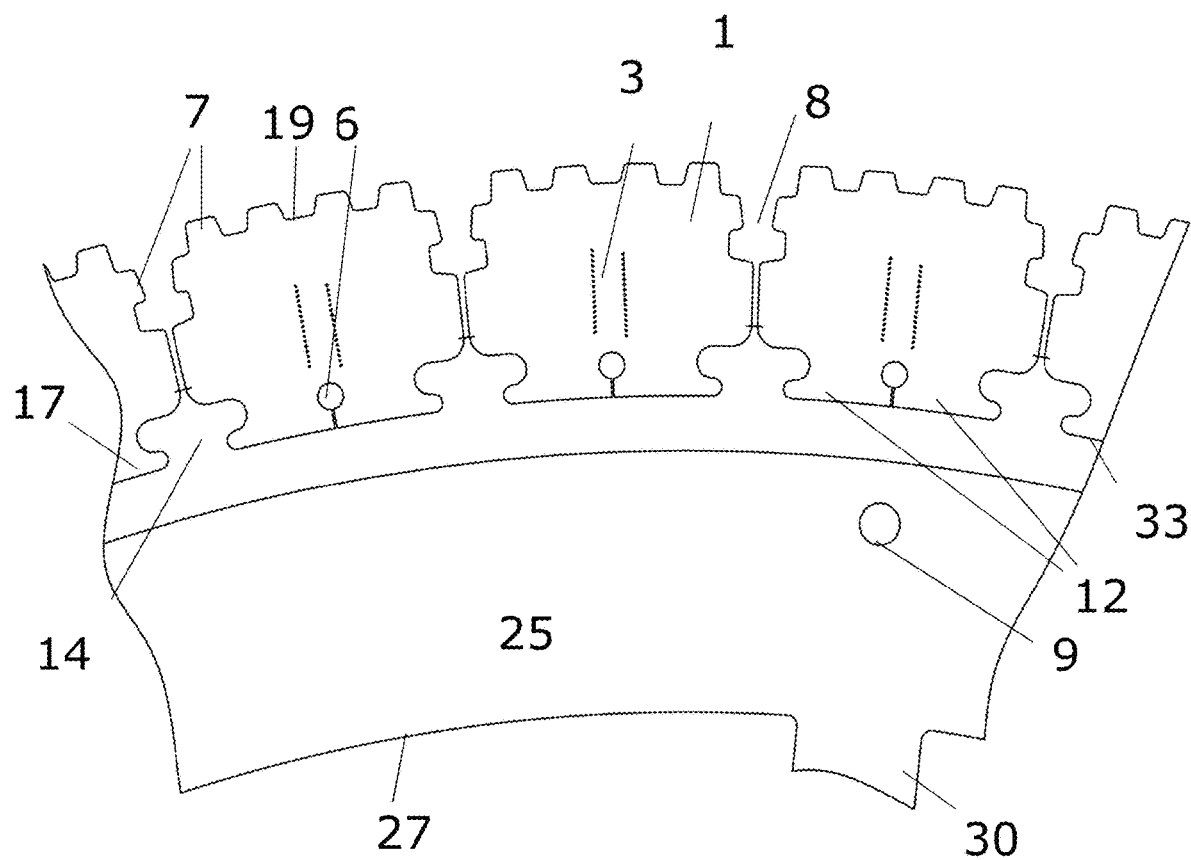
FIG. 4 is another longitudinal cross-sectional view along the line C-C of FIG. 2, illustrating the internal components of another exemplary embodiment of the wheel comprising at least one spring, or other equivalent elastic material, per tire section.
Figure 8:
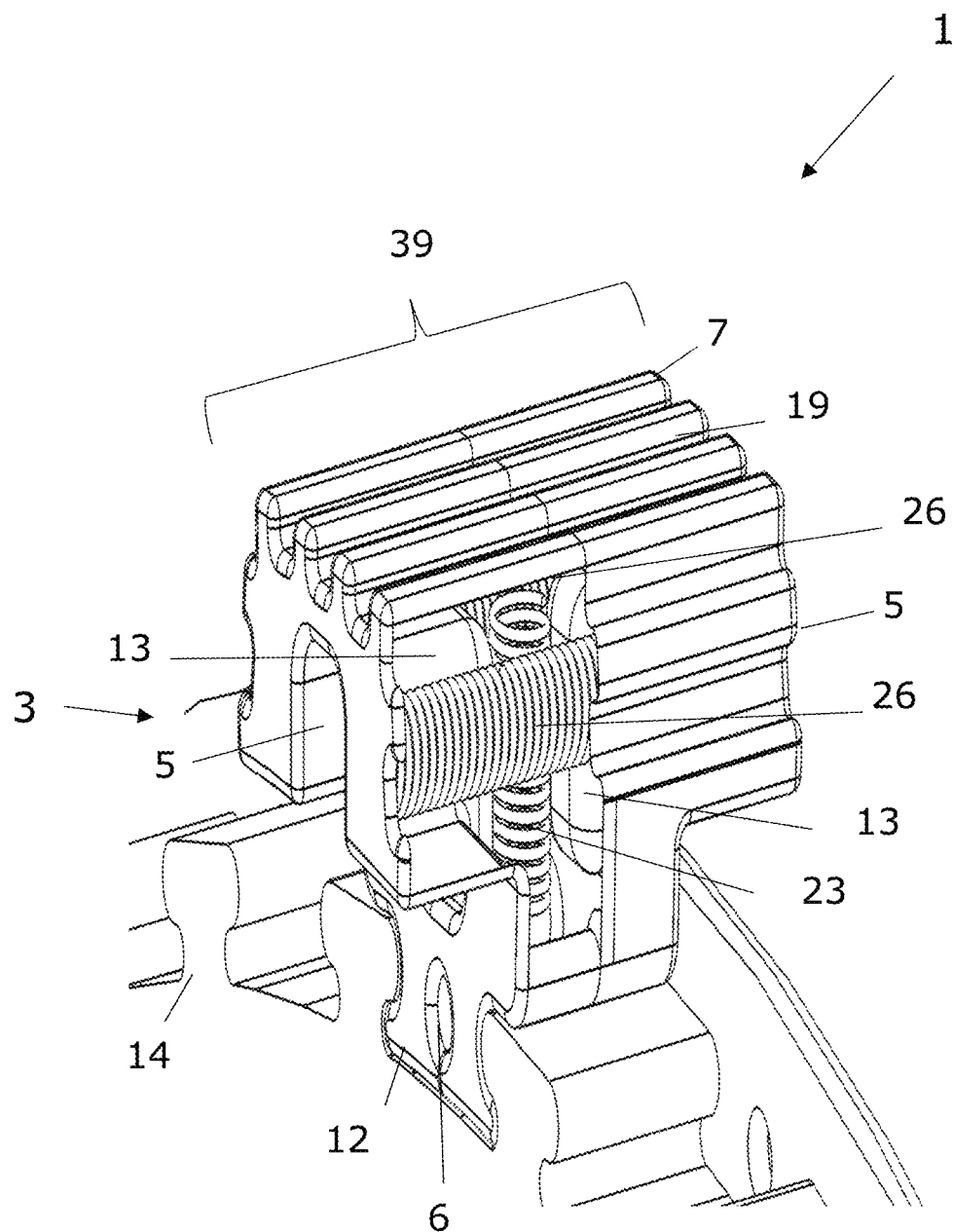
FIG. 8 is an enlarged perspective view of one tire tooth section with an elastic unit comprising side wall cutouts that expose the inner springs (one vertical spring, two horizontal springs), and oval shaped (½ showing) depressions.

As illustrated in FIGS. 4 and 8, the tire outer rubber tread further comprises a plurality lateral grooves 19 comprising evenly spaced notches 7 able to grip or adhere to an obstacle, including a flat surface (e.g. FIG. 6, floor 70). The notches are substantially rectangular-shaped, extending lengthwise between the opposing tire sidewalls (FIG. 5, sidewalls 35, 37) and a tubular groove 19 situated between the adjoining notches.

Inner Tire and Outer Rim Fixation

As illustrated in FIGS. 3 and 4, the circular rim 25 comprises a rim outer surface 33 comprising a plurality of evenly spaced, substantially T-shaped projections 14 with a space 57 between each. Each tire teeth section 1 on the tire inner surface 17 and the rim outer surface T projection 14 securely fit together (e.g. male and female units). As exemplified herein, each tire section 1 inner surface 17 comprises: two substantially "L-shaped projection units" 12 (FIG. 3); or alternatively one substantially "T-shaped projection unit" (equivalent to the two units 12 formed as one unit without a space 18). The "L-shaped" projections 12 are oriented back-to-back but for a thin line of space 18 of about 1-3 millimeters, or less, depending on the size of the entire wheel apparatus 15.

As illustrated in FIGS. 3 and 4, each tire tooth section 1 further comprises a center hole fitted by a retaining pin 6. As further illustrated in FIG. 5, at least one set of retaining pins 6 are used to extend from both hoop 45 outer side wall's via holes 36, through the hoop 45, and into the tire 20. It is noted that the retaining pin or screw may comprise any fixation device well known in the art of wheels or the like. In another embodiment, one set of retaining pins 6 extend into each hoop 45 (e.g. two sets total of pins 6).

In an alternative embodiment, the tire inner surface 17 is flat, and the rim outer surface 39 is flat, and the two are permanently affixed using devices well known in the art (e.g. screws, pins, cement glue, etc.).

Elastic Middle Unit

Each tire section 1 further comprises a middle elastic section 3 (e.g. FIGS. 1, 2, 8). As illustrated in the enlarged view of FIG. 8, elastic unit 3 of each tooth section 1 comprises: at least one vertical coil spring 23 (for direct vertical loading to tire); and may further comprise at least two horizontal springs 26 (for side loading to each tire). Each elastic unit 3 further comprises two substantially oval-shaped (or ½ oval-shaped) depressions 5 on opposing sides of the tooth section 1, with an inner wall 13 that encloses and maintains the spring 23 in a vertical position when compressed or relaxed.

The elastic section 3, and the tire tread notches 7, function to dampen (i.e. reduce) the vibrations of the wheel's mechanical structure for a smoother ride, and to reduce jarring of components within the wheel(s) and the vehicle.

The tires herein also do not rely upon foam, or compressed air being pumped to specified ranges of pounds per square inch (PSI), so they cannot fail due to puncture, or be damaged by over or underinflating the tires.

EXEMPLIFICATION

By way of exemplification, the present invention further comprises a method of safely climbing a flight of stairs with a wheelchair equipped with two-wheel apparatuses 15 disclosed herein, and further comprising a push rim 55 attached to the outer surface of each wheel 15 for the user to manual rotate the wheel 15. The method first comprises the step of affixing a wheel apparatus of the present invention to opposing sides of a wheelchair by methods well known in the art. Each wheel apparatus comprises: a tire (20) comprising a plurality of individual teeth sections (1), each with a tire inner surface (17), two opposing sidewalls (35, 37), an outer tire tread surface (39), and wherein each tooth section is substantially rectangular-shaped or square-shaped with a center elastic unit (3), and adjoining teeth sections are separated via a thin space (8); a circular rim (25) with a rim inner surface (27), and rim outer surface (33) attachable to the plurality of teeth sections, and a plurality of evenly spaced wheel spokes extending from the rim inner surface (27) to a central hub (50); two hoop rings (45) mounted on both opposing tire sidewalls covering the rim (25) while exposing the tire teeth section's (1) outer tread surface (39) and the elastic unit (3).

The method further comprises the steps of: rolling the wheelchair onto an obstacle edge 10 until at least two adjoining tire teeth sections (e.g. FIGS. 3, 1*a*, 1*b*) on each wheel apparatus 15 are situated around the front and back of the obstacle edge. The next step requires pivoting the wheelchair over the obstacle while the tire teeth sections 1*a*, 1*b* grip the obstacle edge 10 at the teeth space 8; hence, the wheel apparatus's vehicle is able to traverse obstacles safely (e.g. stairs, curbs, etc.), without slipping.

In an additional embodiment, the wheelchair may or may not require the assistance of a caregiver pushing the wheelchair, such as the wheelchair disclosed in US Patent Application 20180021193 A1, published Jan. 24, 2018, by the same inventors as herein (i.e. two side wheelchair wheels substituted with two wheel apparatuses 15 of the present invention), the entire contents of which are incorporated herein by reference. FIG. 7 illustrates a caregiver 60 pulling a wheelchair 62 up a flight of stairs using wheels 15 comprising teeth sections 1 that grip the floor 70, and that grip the curb edge 10 in space 8 between two adjoining teeth sections 1.

Wheelchairs suitable for use with the wheel apparatuses 15 of the present invention are well known in the art, and may further comprise one outer wheel, (i.e. a push rim or hand rim), on the exterior side of each of the wheel apparatuses (e.g. see FIGS. 6 and 7, push rims 55). The push rim 55 is smaller in diameter than the wheel 15, so as to not touch the ground. Hence, the push rim 55 does not require a tire with tread; but it may comprise a layer of padded material to protect the user's hands. Push rims (i.e. hand rims) are commonly used by the rider to control the movement of the wheelchair by rotating the push rims forward and backward (i.e. clockwise, counterclockwise).

In addition to wheelchairs, wheel apparatuses 15 are suitable for use with any vehicle requiring enhanced traction with the surface and/or the edges of obstacles that the vehicle traverses. By way of non-limiting examples, appropriate vehicles for use with the wheel apparatuses 15 of the present invention comprise: mountain and road bicycles; wheeled push and motorized carts; light sport utility vehicles; etc. The vehicle may comprise 1-8 wheeled apparatuses 15; and one of skill in the art would readily be able to adjust the size of the wheel apparatus 15 to fit the type of vehicle.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed is:

1. A wheel apparatus attachable to a vehicle that traverses obstacles, the wheel apparatus comprising the components of:
   a tire (20) comprising a plurality of individual teeth sections (1), each with a tire inner surface (17), two opposing sidewalls (35, 37), an outer tire tread surface (39), and wherein each tooth section is substantially rectangular-shaped or square-shaped with a center elastic unit (3), and adjoining teeth sections are separated via a thin space (8);
   a circular rim (25) with a rim inner surface (27), and rim outer surface (33) attachable to the plurality of teeth sections, and a plurality of evenly spaced wheel spokes extending from the rim inner surface (27) to a central hub (50);
   wherein the rim outer surface (33) further comprises:
      a plurality of evenly spaced, substantially T-shaped projections (14) encircling the rim outer surface (33), each T-shaped projection (14) spaced to fit two adjoining teeth sections inner surface (17) that comprise per each tooth section: 1) two substantially L-shaped units (12), and 2) a retaining pin (6), configured to securely fit the tire teeth sections to the rim outer surface;
   two hoop rings (45) mounted on both opposing tire sidewalls covering the rim (25) while exposing the tire teeth section's (1) outer tread surface (39) and the elastic unit (3);

wherein each center elastic unit (3) further comprises:
  at least one coil spring (23) extending vertically, and at least two horizontal springs (26), to enable the tire to provide a dampening of a vibration and a jarring forces on the wheel and on the vehicle;
wherein the wheel apparatus is able to traverse obstacles without slipping, by the adjoining tire teeth sections gripping an obstacle edge and/or a floor surface; and
wherein the tire does not comprise compressed air or foam, and is thus not able to deflate via puncturing or being damaged by over or underinflating the tires.

2. The wheel apparatus of claim 1, wherein the outer tire tread surface (39) further comprises a plurality of evenly spaced lateral grooves (19) with protrusions (7) extending between the tire opposing sidewalls (35, 37) that are able to grip or adhere to an obstacle surface to prevent the wheel apparatus from slipping.

3. The wheel apparatus of claim 1, wherein one hoop is permanently affixed to the circular rim.

4. The wheel apparatus of claim 1, wherein each tire tooth section comprises a rubber material outer surface comprising two opposing half oval-shaped depressions (5) on the two opposing sidewalls (35, 37) encasing the center elastic unit (3).

5. The wheel apparatus of claim 4, wherein the two opposing half oval-shaped depressions (5) further comprise an inner wall (13) surrounding the vertically oriented coil spring (23) to maintain said spring in a vertical position when compressed or relaxed.

6. The wheel apparatus of claim 5, wherein the at least two horizontal springs (26) are for side loading of the tire.

7. The wheel apparatus of claim 1, wherein the vehicle is powered or manually propelled, and at least one wheel apparatus is mounted on one of: a wheelchair, A push-cart, a mountain bicycle, a road bicycle, a light sport utility vehicle, a jeep, and a go-cart.

8. The wheel apparatus of claim 7, wherein the vehicle is a wheelchair comprising the wheeled apparatus on opposing wheelchair sides.

9. The wheel apparatus of claim 8, wherein the wheelchair further comprises a push rim attached to the exterior rim side of each wheel apparatus that a user is able to rotate forward and backward to control movement of the wheelchair.

10. A method of safely traversing a vehicle comprising a wheeled apparatus over an obstacle, without slipping, comprising:
  a) affixing a wheel apparatus to opposing sides of a vehicle, wherein each wheel apparatus comprises:
    a tire (20) comprising a plurality of individual teeth sections (1), each with a tire inner surface (17), two opposing sidewalls (35, 37), an outer tire tread surface (39), and wherein each tooth section is substantially rectangular-shaped or square-shaped with a center elastic unit (3), and adjoining teeth sections are separated via a thin space (8);
    a circular rim (25) with a rim inner surface (27), and rim outer surface (33) attachable to the plurality of teeth sections, and a plurality of evenly spaced wheel spokes extending from the rim inner surface (27) to a central hub (50);
    wherein the rim outer surface (33) further comprises:
      a plurality of evenly spaced, substantially T-shaped projections (14) encircling the rim outer surface (33), each T-shaped projection (14) spaced to fit two adjoining teeth sections inner surface (17) that comprise per each tooth section: 1) two substantially L-shaped units (12), and 2) a retaining pin (6), configured to securely fit the tire teeth sections to the rim outer surface;
    two hoop rings (45) mounted on both opposing tire sidewalls covering the rim (25) while exposing the tire teeth section's (1) outer tread surface (39) and the elastic unit (3);
    wherein each center elastic unit (3) further comprises:
      at least one coil spring (23) extending vertically, and at least two horizontal springs (26), to enable the tire to provide a dampening of a vibration and a jarring forces on the wheel and on the vehicle;
  b) rolling the vehicle onto an obstacle until at least two adjoining tire teeth sections are situated around an edge of the obstacle between the teeth section space;
  c) pivoting the vehicle over the obstacle while the tire teeth sections grip the obstacle edge; and
  d) wherein the wheel apparatus is able to traverse the obstacle without slipping, by the adjoining tire teeth sections gripping the obstacle edge and/or a floor surface; and
  e) wherein the tire does not comprise compressed air or foam, and is thus not able to deflate via puncturing or being damaged by over or underinflating the tires.

11. The method of claim 10, wherein the outer tire tread surface (39) further comprises a plurality of evenly spaced lateral grooves (19) with protrusions (7) extending between the tire opposing sidewalls (35, 37) that are able to grip or adhere to the obstacle edge and/or the floor surface to prevent the wheel apparatus from slipping.

12. The method of claim 10, wherein one hoop is permanently affixed to the circular rim.

13. The method of claim 10, wherein each tire tooth section comprises a rubber material outer surface comprising two opposing half oval-shaped depressions (5) on the two opposing sidewalls (35, 37) encasing the center elastic unit (3).

14. The method of claim 13, wherein the two opposing half oval-shaped depressions (5) further comprise an inner wall (13) surrounding the vertically oriented coil spring (23) to maintain said spring in a vertical position when compressed or relaxed.

15. The method of claim 10, wherein the vehicle is a wheelchair, and the obstacle is a flight of stairs.

* * * * *